July 2, 1946. W. H. WORTHINGTON 2,403,422
POWER LIFT
Filed Aug. 6, 1942 6 Sheets-Sheet 4

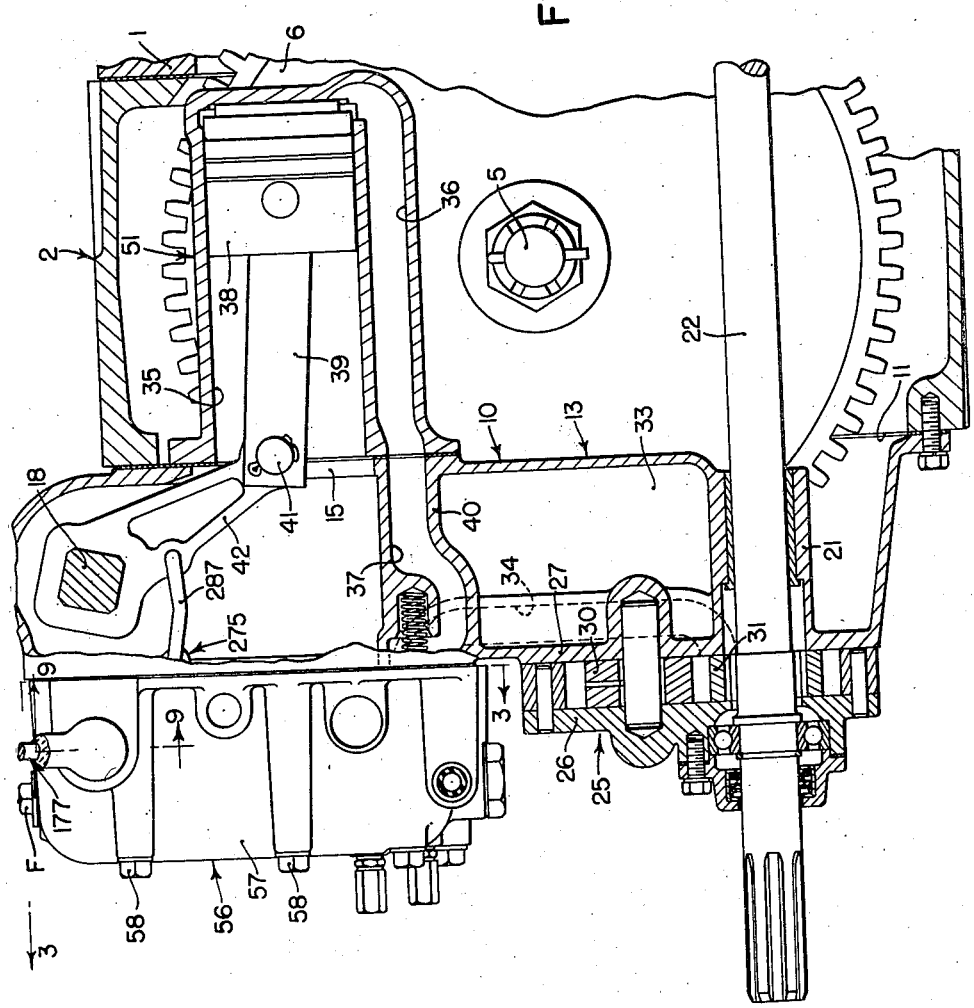

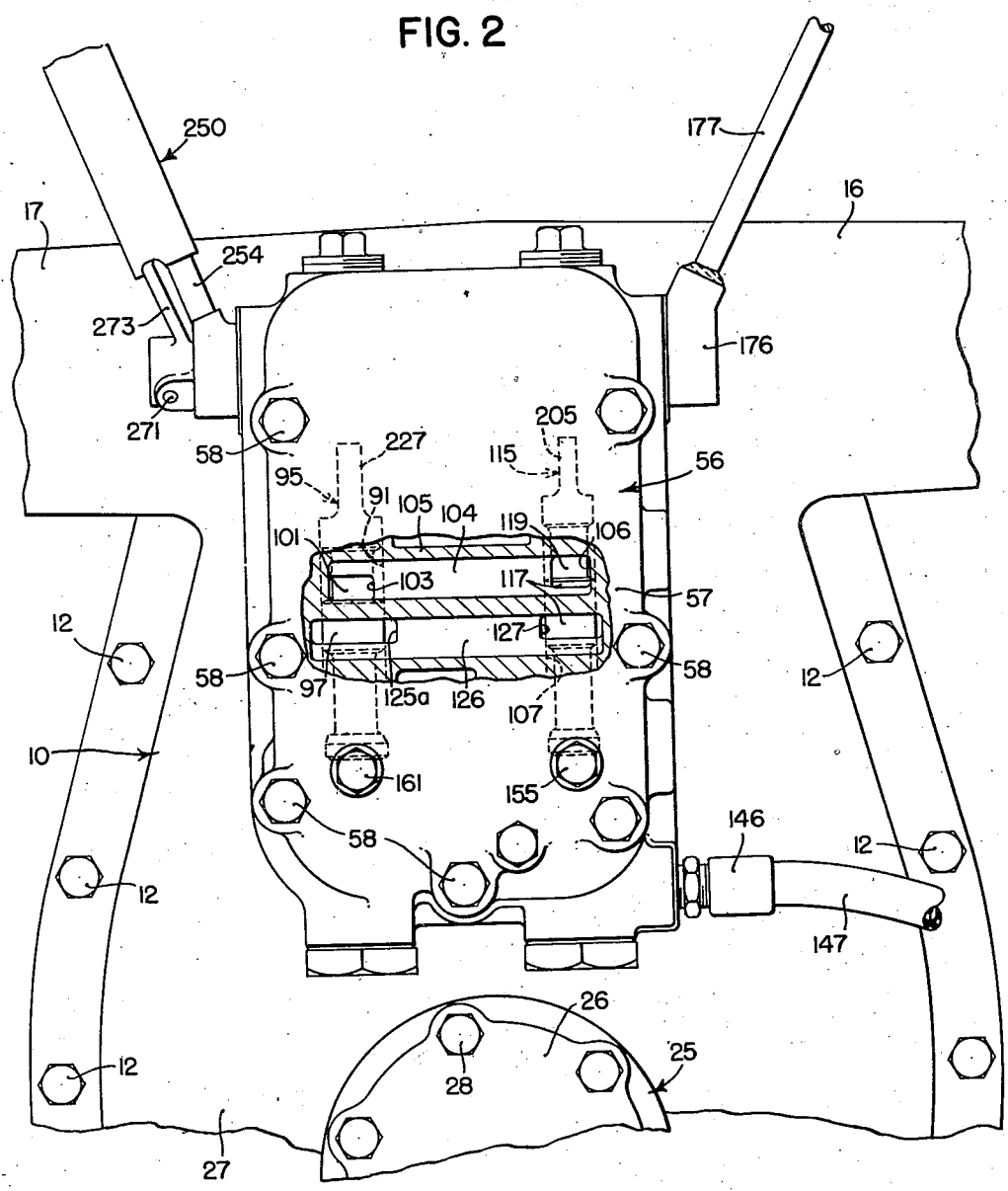

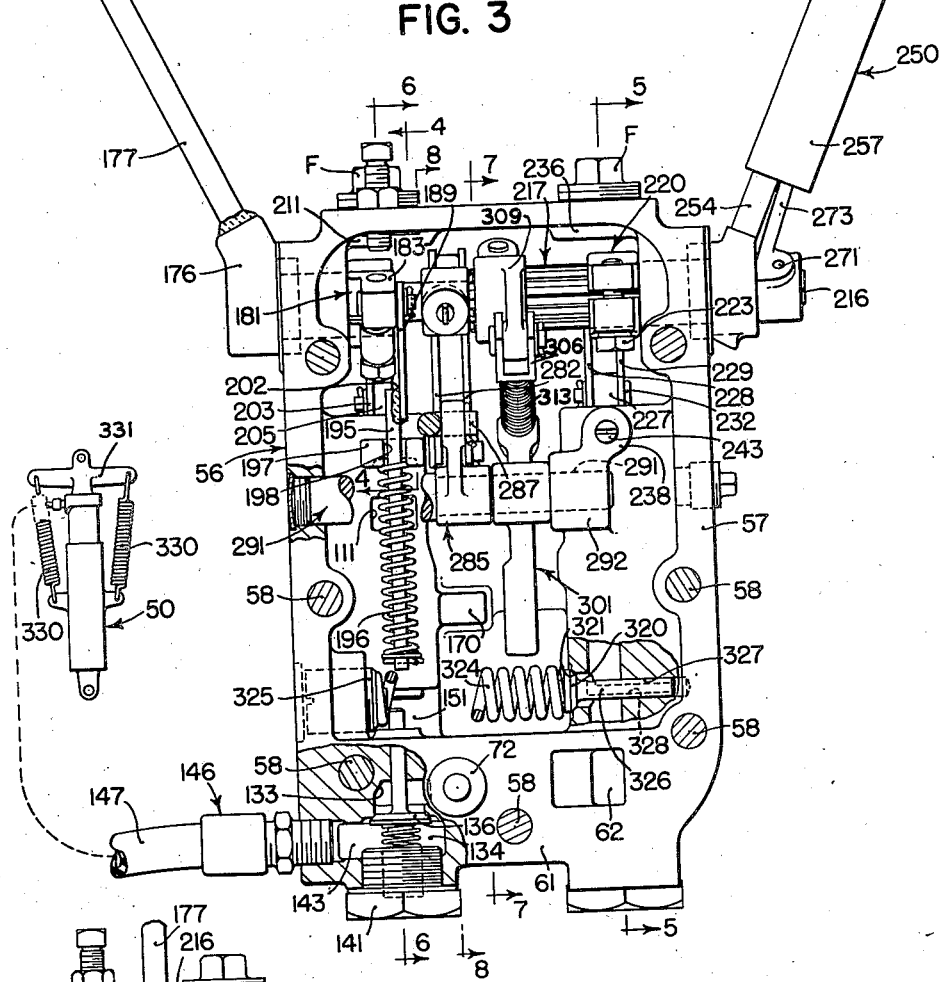
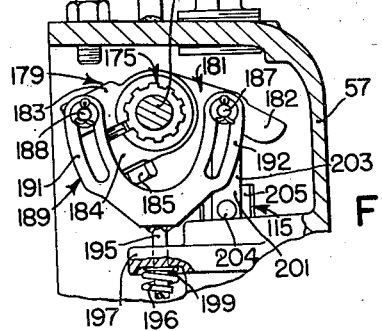

INVENTOR
WAYNE H. WORTHINGTON
BY
ATTORNEYS

July 2, 1946.    W. H. WORTHINGTON    2,403,422
POWER LIFT
Filed Aug. 6, 1942    6 Sheets-Sheet 5
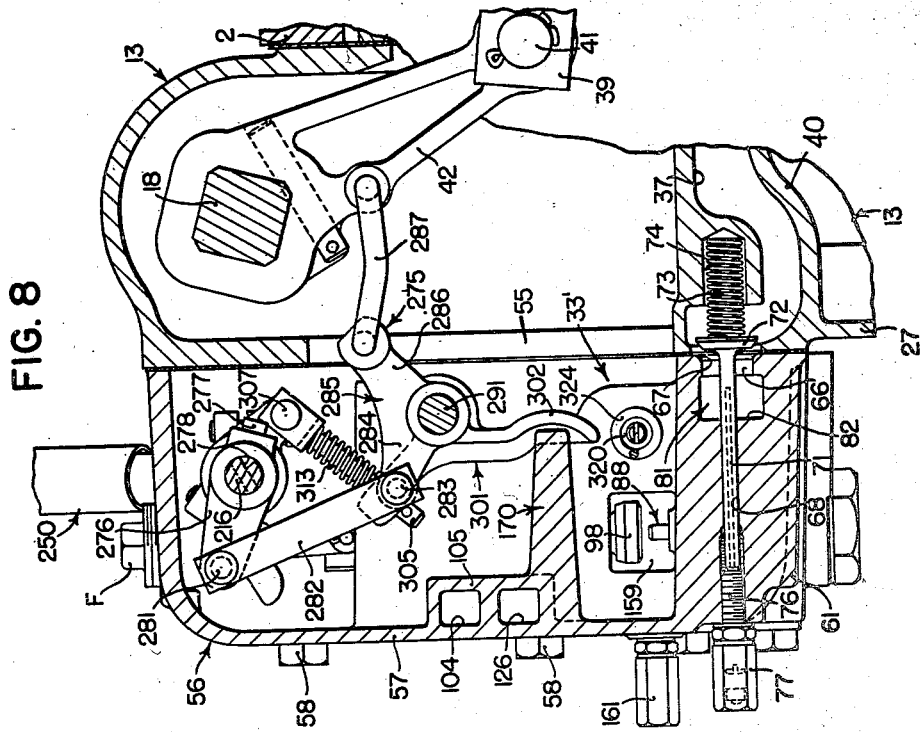
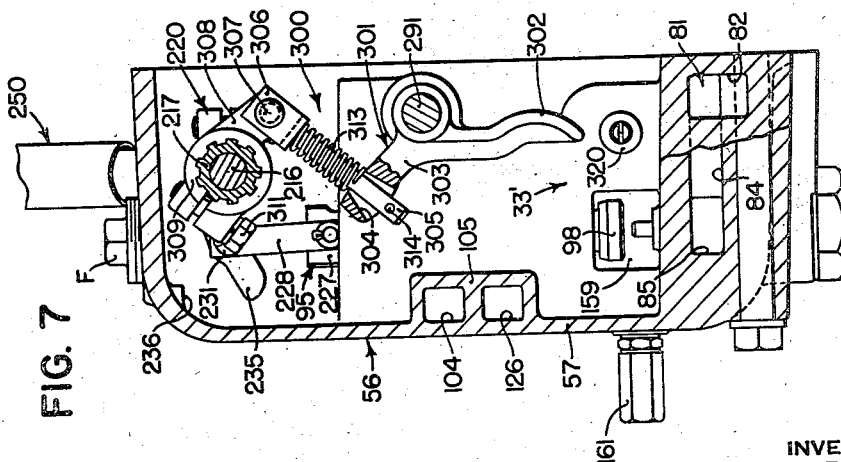
INVENTOR
WAYNE H. WORTHINGTON
BY
ATTORNEYS July 2, 1946.  W. H. WORTHINGTON  2,403,422
POWER LIFT
Filed Aug. 6, 1942  6 Sheets-Sheet 6
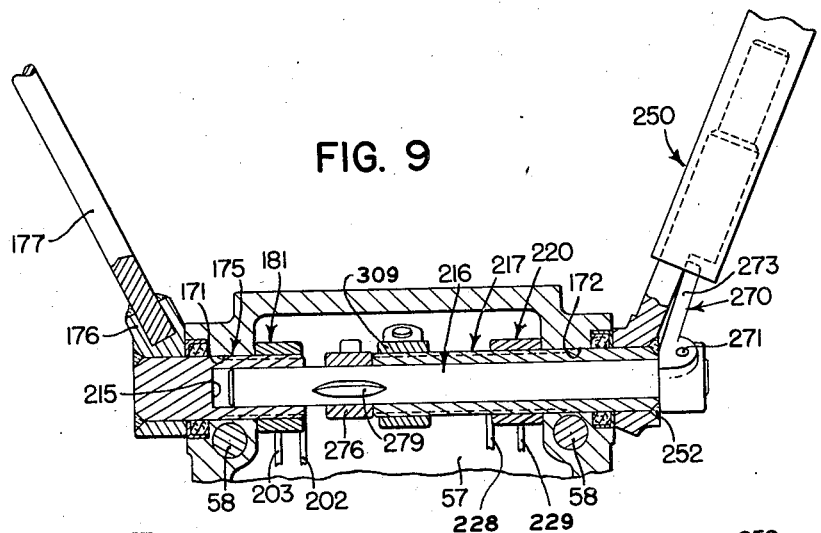
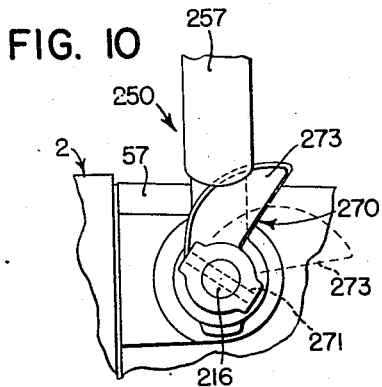
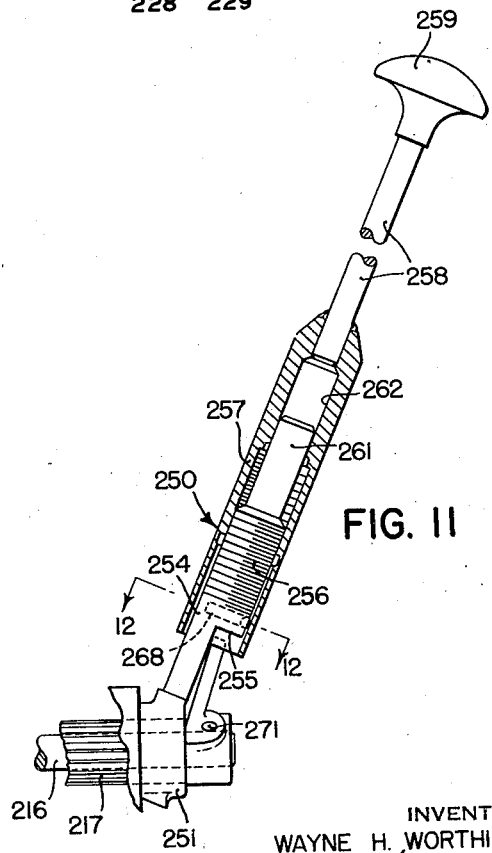
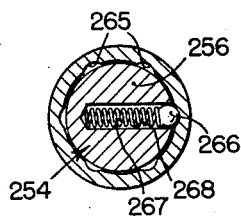
INVENTOR
WAYNE H. WORTHINGTON
BY
ATTORNEYS Patented July 2, 1946

2,403,422

UNITED STATES PATENT OFFICE 2,403,422

POWER LIFT

Wayne H. Worthington, Waterloo, Iowa, assignor to John Deere Tractor Company, Waterloo, Iowa, a corporation of Iowa Application August 6, 1942, Serial No. 453,907

14 Claims. (Cl. 60—97)

This application is a continuation in part of my co-pending application, Serial No. 414,631, filed October 11, 1941, and now abandoned.

The present invention relates generally to power lift mechanisms for agricultural tractors and the like, and is more particularly concerned with new and useful improvements in hydraulically operated power lift apparatus carried by a farm tractor and driven by the tractor motor.

The object and general nature of the present invention is the provision of a hydraulic lifting mechanism embodying a pair of operating ram units deriving operating energy from a single fluid pressure pump, and new and improved control means carried as a compact self-contained unit on the tractor and including mechanism associated with at least one of the ram units whereby movement of the latter may automatically be terminated after a given extent of movement, depending upon the position of an adjustable part which may be set in different positions. Thus, a mechanism of this kind is admirably adapted for use on an agricultural tractor for the control of ground working tools in which such adjustment mechanism may be employed for determining the operating depth of the tools.

More specifically, it is a feature of this invention to provide new and improved control means for hydraulic lifting mechanism of the type including a piston and cylinder to which a fluid, preferably oil, is supplied under pressure and controlled by a movable valve member or the like.

It will be appreciated that when a connection is established between the valve and the piston whereby movement of the latter to a predetermined position automatically returns the valve to a neutral position, the movement of the piston after it has engaged the control valve and started to close the same becomes progressively slower, since the valve is moved toward its closed position the flow of fluid to the cylinder likewise is reduced, thus slowing down the movement of the piston, and this in turn causes even slower movement of the valve. It is evident that the last part of the piston movement becomes very slow indeed, at which time the valve is barely cracked open to admit a small stream of oil to the cylinder. The action of this small stream of oil under pressure against the edges of the valve elements deteriorates the latter by wear, and furthermore the slow movement of the piston as it approaches its terminal position is undesirable from an operating standpoint. Therefore, it is a feature of this invention to provide a control device for the hydraulic mechanism, which will cause the control valve to be moved quickly and positively from its open to its closed position and thus to stop the movement of the hydraulic piston more abruptly.

This object has already been accomplished by providing a spring for actuating the valve element, the spring being energized manually through the manual control lever of the valve, whereupon the piston releases a trigger device which permits the spring to shift the valve to closed position. With this arrangement, however, the manual control of the valve is held out of action by the trigger, thus preventing the manipulation of the manual control lever during the full stroke of the piston. In other words, this arrangement provides only for a full stroke operation of the hydraulic piston. A more specific object of my invention, therefore, relates to the provision of a control device for hydraulic mechanism by which the sudden cut-off at the end of the piston stroke is obtained, without sacrifice of the control of the piston at any point within its range of movement. Particularly, it is a feature of the present invention in this connection to provide a pivoted bell crank, adapted to be engaged by the piston or a part movable therewith, with an arm disposed generally parallel with respect to a second arm operatively connected with the hydraulic valve to be closed, and with a compression spring unit connected between said generally parallel arms, whereby positive control of the valve is effected.

Another important feature of the present invention is the provision of an improved control valve box arrangement particularly accommodating a manual control of the two ram units and enclosing the operating linkage by which the manual control is augmented by an auxiliary control associated with one of the manual controls whereby the associated ram unit is capable of a variable stroke and may be hydraulically locked in any one of a number of positions of adjustment. An arrangement of this kind is particularly applicable for the control of farm implements.

These and other objects and advantages of the present invention will be apparent to those skilled in the art after a consideration of the following detailed description, taken in conjunction with the accompanying drawings, in which:

Figure 1 is a vertical longitudinal section, certain parts being shown in elevation, taken through the rear axle and associated parts of a farm tractor equipped with a hydraulic power lift and control mechanism constructed according to the principles of the present invention;

Figure 2 is a rear view of the portion of the tractor and power lift shown in Figure 1;

Figure 3 is a view taken generally along the line 3—3 of Figure 1 and looking rearwardly into the control valve box;

Figure 4 is a fragmentary sectional view taken generally along the line 4—4 of Figure 3, showing the biased means that normally holds one of the control valves in a neutral position;

Figure 6:
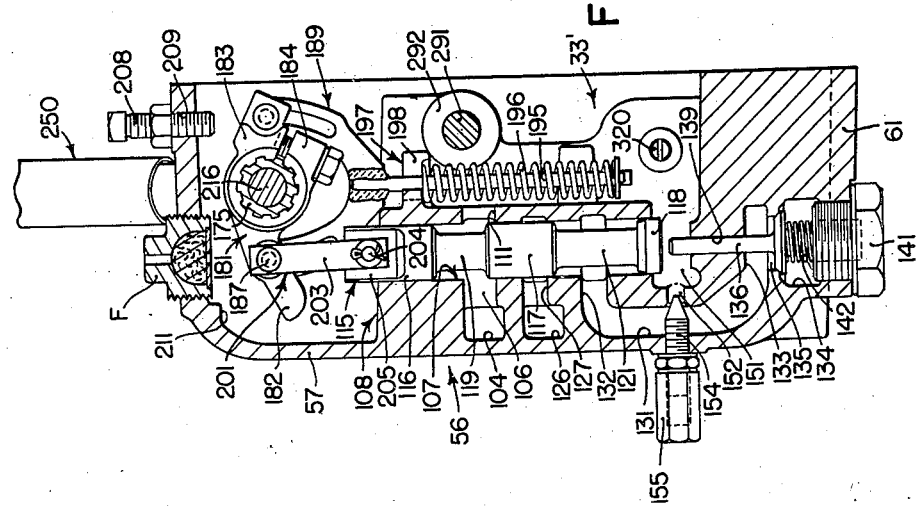
Figure 5:
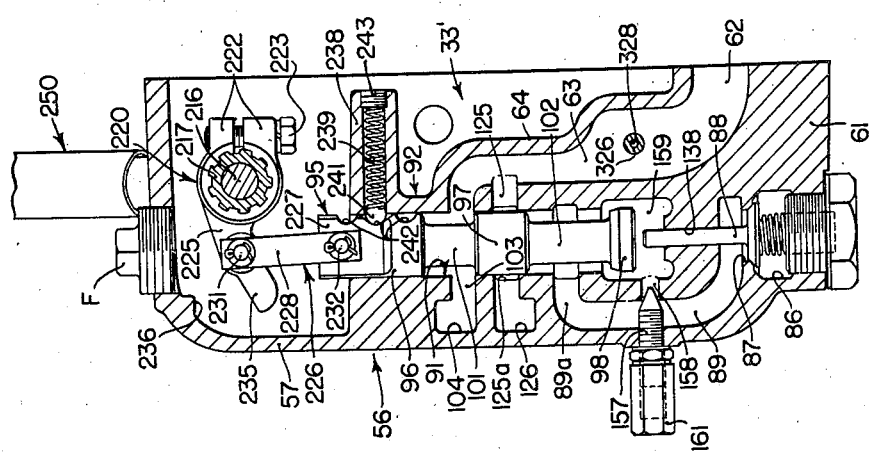

Figures 5 and 6 are sectional views taken, respectively, along the lines 5—5 and 6—6 of Figure 3 and looking in the direction of the arrows;

Figures 7 and 8 are sectional views taken generally along the lines 7—7 and 8—8, respectively, of Figure 3;

Figure 9 is a sectional view taken generally along the line 9—9 of Figure 1;

Figure 10 is a fragmentary side view of the manually shiftable control handle, with the member that moves with one of the ram units for automatically returning the valve handle to a neutral position;

Figure 11 is a detail view, illustrating the mounting of the adjustable member on the valve control handle shown in Figure 10; and Figure 12 is a section taken along the line 12—12 of Figure 11.

Referring now to the drawings, more particularly Figures 1 and 2, the reference numeral 1 indicates the rear portion of the combined crank case and supporting framework of a tractor of well-known construction, and the reference numeral 2 indicates the rear axle housing of such a tractor. The axle housing 2 comprises laterally directed extensions each receiving a drive shaft 5 journaled therein by any suitable means, and at its inner end each drive shaft carries a large driving gear 6 actuated by suitable transmission mechanism and differential means.

The hydraulic mechanism with which the present invention is more particularly concerned includes a unit, indicated in its entirety by the reference numeral 10, which is adapted to be bolted over the rear opening 11 of the axle housing 2, as best shown in Figure 1, the bolts being indicated in Figure 2 by the reference numeral 12. The unit 10 includes a housing 13 in the upper portion of which is an opening 15, and the upper portion of the housing 13 is formed with right and left hand lateral housings or sleeve portions 16 and 17 in which a lifting rockshaft 18 is mounted for rocking movement upon suitable bearing means. The lower portion of the housing 13 is formed with a journal 21 adapted to receive the rear end of a power take-off shaft 22 driven by suitable means (not shown) from the tractor motor. The lower portion of the housing 13 also carries a hydraulic pump 25 of the positive displacement type, comprising a housing 26 or pump body secured to the rear wall 27 of the housing 13, as by bolts 28. The pump gears are indicated at 30 and 31, the latter gear being secured in any suitable manner to the rear portion of the power take-off shaft 22, as best shown in Figure 1. The housing 13 is formed so as to serve as a sump 33 with which the suction side of the pump 25 communicates by means of an opening (not shown). The housing 13 is also formed with an upwardly extending passage 34, the lower end of which communicates with the high pressure side of the gear pump 25. Secured in any manner over the opening 15 in the forward wall of the housing 13 is a cylinder 35 closed at its forward end and open at its rear end over the opening 15. The forward closed end of the cylinder 35 communicates with a longitudinally extending passage 36 which at its rear end communicates with a passage 37 formed in a longitudinally extending section 40 of the housing 13. A piston 38 is movably mounted within the cylinder 35 and receives a piston rod 39 which at its rear end is pivoted by a pin 41 to the lower end of an arm 42 secured to the generally central portion of the lifting rockshaft 18.

The construction as so far described is substantially the same as that shown in the prior patent to E. McCormick et al., No. 2,107,760, dated February 8, 1938, to which reference may be made if necessary.

According to the principles of the present invention suitable control mechanism is provided for controlling the flow of fluid under pressure to and from the pump 25 and not only the cylinder 35 but also an auxiliary or second cylinder which preferably is mounted exteriorly of the tractor. This auxiliary cylinder or ram unit is indicated in its entirety by the reference numeral 50 and is shown somewhat diagrammatically in Figure 3. It will be understood that this cylinder may be connected in any suitable manner to any implement part or other member which it is desired to control by the valve mechanism, with which the present invention is more particularly concerned, that is employed for also controlling the main cylinder and piston disposed in the rear axle housing 2. The main piston and cylinder unit or ram unit is indicated in its entirety in Figure 1 by the reference numeral 51.

The rear wall 27 (Figure 8) of the central housing 13 is provided with a rear opening 55 over which a valve or control box, indicated in its entirety by the reference numeral 56, is adapted to be secured. The control box 56 includes a casing or housing 57 having means whereby it may be secured in place over the opening 55, such as by cap screws 58. The front side of the casing 57 is open while the sides and rear and bottom walls are formed with various valve controlled and other passages which will now be described.

The bottom wall 61 of the valve casing 57 is provided with an opening 62 adjacent the left side (the right side as viewed in Figure 3) and the opening 62 lies at the lower forward end of a generally vertically extending high pressure passage 63 (Figure 5). The opening 62 is disposed in such a position as to communicate with the upper end of the passage 34 (Figure 1) which leads upwardly from the high pressure side of the pump 25. As best shown in Figure 5, the passage 63 is formed in a thickened portion 64 of the valve casing 57. At the other side of the casing 57 the lower wall 61 thereof is formed with an opening 66 (Figures 3 and 8) which is formed with a valve seat 67 and opens into valve-controlled communication with the rear end of the passage 37 (Figures 1 and 8) that leads to the closed end of the cylinder 35. A longitudinal bore 68 is formed in the bottom wall 61 of the valve casing 57 and receives the stem 71 of a valve 72 which is urged toward a position closed against the valve seat by a spring 73 seating against the valve 72 and in a socket 74 formed in the section 40 of the housing 13, as best shown in Figure 8. The outer portion of the bore 68 in the valve casing 57 is threaded to receive an adjusting screw 76, the adjustment of which is retained by a lock nut 77. The valve 71, 72 is free to slide forwardly away from the adjusting screw 76 against the tension of the spring 73, but the degree of closing against the seat 67 is regulated by the adjusting screw. This valve therefore serves as means restricting the flow of fluid from the cylinder 35 back through the passage 37 and through the opening 66 into the valve box 56, yet the flow of fluid from the valve box through the opening 66 and into the passage 37, and hence to the cylinder 35, is relatively unrestricted, since the spring 73 is comparatively light.

The opening 66 (Figure 8) lies at the forward end of a passage 81. This passage 81 includes an enlarged section 82 communicating directly with the opening 66, the enlarged section 82 extending laterally inwardly toward the central vertical plane of the valve casing 57 and then rearwardly, as at 84 (Figure 7). The passage section 84 communicates with a laterally extending passage section 85 (Figure 7) which at the left side of the casing 57 (right side as viewed in Figure 3), opens into communication with a passage section 86 (Figure 5), substantially directly behind, but not in communication with, the opening 62 in the high pressure passage 63. The passage section 86 communicates upwardly through an opening 87 having a valve seat with which a valve 88 cooperates, into communication with a branch passage 89, which is generally U-shaped as shown in Figure 5.

Referring again to Figure 5, it will be seen that the upper portion of the high pressure passage 63 and the upper and forwardly extending portion 89a of the branch passage 89 open into communication with a vertically extending control valve bore indicated in its entirety by the reference numeral 91. This control valve bore 91 is formed in a thickened section, indicated at 92, of the rear and adjacent side wall of the valve housing 57. The valve member operating in the valve bore 91 is indicated in its entirety by the reference numeral 95 and includes an upper cylindrical section 96, an intermediate cylindrical section 97, and a lower cylindrical section 98, connected by narrow necks or shanks 101 and 102. The upper portion of the high pressure passage 63 opens into the upper part of the control valve bore 91, and the high pressure passage 63 is extended rearwardly past the bore 91, as at 103 (Figure 2), and communicates with a cross passage 104 that extends transversely of the valve box, being formed in a thickened transverse section 105 (Figures 7 and 8) thereof. The control valve bore 91 (Figure 5) just referred to lies at the left side of the valve box 56 (right side as viewed in Figure 3), and at the other side of the valve box the cross passage 104 extends forwardly, as at 106 (Figure 6), and opens into communication with a second control valve bore 107 formed in a thickened section 108 of the valve box and which, in constructional arrangement, is substantially like the control valve bore 91 described above. The control valve bores 91 and 107 are disposed vertically and substantially in parallelism, and the passage section 106, extending forwardly from the end of the cross passage 104 (Figure 6), communicates through an opening 111 (Figures 3 and 6) into the interior of the valve casing 57 and which may be considered as an extension 33' of the sump 33 (Figure 1) in that fluid discharged from the valve bores 91 and 107 flows out into the interior of the casing 57 and thence into the sump proper, indicated at 33 in Figure 1. A second control valve 115 is disposed in a vertical position in the bore 107 (Figure 6) and, like the valve 95 described above, comprises three cylindrical sections 116, 117 and 118 connected together by necks or shanks 119 and 121. Preferably, the valves 95 and 115 are identical to facilitate their manufacture.

Referring now to Figure 5, a passageway 125 opens into the high pressure passage 63 and intersects the main control valve bore 91, extending rearwardly and opening into communication with a cross bore 126 disposed parallel with the upper cross bore 104 and formed in the thickened casing section 105 (Figures 7 and 8). At the right side of the valve box, left side as viewed in Figure 3, the cross bore 126 communicates with a passage extension 127 that intersects the auxiliary valve bore 107. Normally, the passages 125 and 127 are closed by the cylindrical sections 97 and 117 of the main and auxiliary valves 95 and 115 (Figures 5 and 6). Below the passage 127 (Figure 6) a U-shaped branch passage 131 is formed having an upper portion 132 intersecting the lower part of the auxiliary valve bore 107 and a lower extension 133 opening into communication with an outlet chamber 134 through a valve controlled opening 135 in which a valve 136 is disposed. The valve 88 (Figure 5) and the valve 136 (Figure 6) are substantially identical, each having a stem extending upwardly through a suitably formed opening in the body of the valve housing so that both valves may be operated by downward movement of the valves 95 and 115, respectively. The opening for the stem of the valve 88 is indicated at 138 in Figure 5, and the opening for the stem of the valve 136 is shown at 139 in Figure 6. These openings fit the valve stems closely so as to be substantially leak-tight. The outlet chamber 134 is closed at its lower end by a screw-threaded plug 141, between which and the valve 136 is a spring 142. The outlet chamber 134 communicates with a lateral extension 143 into which the threaded fitting 145 of a hose connection 146 is secured. A hose 147 leads from the connection 146 to the auxiliary cylinder and piston or ram unit 50, as best shown in Figure 3. As best shown in Figure 6, there is an open space 151 around the upper end of the stem of the valve 136 and below the end 118 of the valve 115, the open space 151 communicating with the reservoir 33'. A leak opening 152 connects the branch passage 131 with the space or opening 151, and flow through the leak opening 152 is controlled by a needle valve 154 held in any position of adjustment by a lock nut 155. As best shown in Figure 5, a similar needle valve 157 controls a leak opening 158 extending between the branch passage 89 and an open space 159 that lies between the lower end 98 of the valve 95 and the upper end of the stem of valve 88, the space 159 opening laterally into direct communication with the reservoir 33', as best shown in Figures 7 and 8. A lock nut 161 holds the needle valve 157 in any position of adjustment. Normally, the controlled flow through the leak openings 152 and 158 into the reservoir 33' is relatively small.

The valve operating linkage and control mechanism therefor will now be described. Briefly, the main valve 95 is so controlled as to be movable manually into a position causing fluid to be directed under pressure into the forward end of the cylinder 35, with suitable means interconnected with the piston for automatically returning the main valve 95 to a neutral position when the piston is fully extended. A lug 170 (Figures 3 and 8) on the inside of the casing 57 forms a stop against which the arm 42 or link 39 may engage if the valve return means should not function. The valve 95 is also automatically controlled, preferably through the arm 142 and link 39, for automatically returning the main valve 95 to neutral position when the piston 38 moves forwardly (to the right, Figure 1) to a given position and hydraulically locking the piston 38 against further retrograde movement. The position in which the piston is automatically stopped may be varied by suitable adjusting means. Preferably, the auxiliary valve 115, which controls the flow of fluid under pressure to and from the auxiliary ram unit 50, is arranged with suitable spring means for automatically returning the same to a neutral position after it has been moved in either a raising or lowering direction out of a neutral position.

Referring now more particularly to Figures 3 and 9, the upper portion of the valve case has its side walls apertured, as at 171 and 172, to receive portions of the valve control mechanism. The right-hand side wall aperture 171 receives a tubular shaft member 175 which extends through the casing wall and at its outer end has welded or otherwise secured thereto a hub member 176 to which an operating handle 177 is secured. The inner end of the tubular shaft 175 is splined and receives a two-armed member 179 (Figure 4), one arm 181 of which has an extension 182 and the other arm 183 of which is formed with a split section 184 adapted to be clamped about the shaft 175 by a clamping cap screw 185. Both of the arms 181 and 183 carry pivot pins 187 and 188, respectively, which are received in the arm portions 191 and 192 of a yoke member 189. The arms 191 and 192 are slotted in an arcuate direction about the axis of the tubular shaft 175, whereby either pin 187 or 188 may move downwardly without moving the yoke 189, but upward movement of either pin will raise the yoke. The latter is secured to a vertical rod 195 that is disposed vertically in the valve case 57 and at its lower end receives a biasing spring 196 and at its upper end passes through the bifurcated lug 197, the bifurcation or slot receiving the pin 195 being indicated by the reference numeral 198 in Figures 3 and 6. The lug 197, as best shown in Figure 4, has a socket 199 in which the upper end of the spring 196 is placed. The spring 196 is normally under initial compression when the lower end is connected to the pin or rod 195, and hence the seating of the upper end of the spring 196 in the socket 199 serves to hold the associated parts in position. The arm 181 (Figure 4) of the member 179, is connected by a link member 201, preferably formed of two links 202 and 203, to the upper end of the valve 115, as by a pivot pin 204. Preferably, the upper end of the valve 115 is provided with a flattened extension 205 to receive the lower end of the link connection 201. As best shown in Figure 6, an adjusting screw 208 is mounted in a threaded opening 209 in the upper wall of the case 57 so that its lower end is in a position to serve as a stop for the lever arm 183, thus limiting the movement of the valve operating member 181 in one direction. Movement of the member 181 in the other direction is limited by the engagement of the lever arm extension 182 (Figure 6) with an abutment section 211 formed on the inner surface of the valve case adjacent the junction of the upper and rear walls.

Referring again to Figure 9, the tubular shaft 175 includes a socket 215 in which one end of a transverse shaft 216 is disposed. A tubular shaft 217 receives the other end and major portion of the shaft 216 and is disposed for rocking movement in the casing wall opening 172. A main valve operating member, indicated in its entirety by the reference numeral 220, is secured to the tubular shaft 217 adjacent the left side wall of the valve case 57 (right side as viewed in Figures 3 and 9). The valve operating member 220 is splined to receive the splined exterior portion of the tubular shaft 217 and is bifurcated, as at 222 (Figure 5), and provided with a clamping cap screw 223 for attachment to the tubular shaft 217. The member 220 includes an arm 225 that extends rearwardly (Figure 5) and is connected by a link member 226 with the upper flattened end 227 of the main valve 95. Preferably, the link member comprises a pair of links or straps 228 and 229 (Figures 3 and 9), the upper ends of which are apertured to receive a pivot pin 231, and the links 228 and 229 are similarly apertured at their lower ends to receive a pivot pin 232 by which they are connected to the upper end 227 of the valve 95. An extension 235 is formed on the arm 225 and is adapted to engage a boss 236 formed on the valve case 57 (Figure 5), whereby the clockwise rocking movement of the valve operating member 220 is limited. The valve case 57 has a bored extension 238 receiving a detent spring 239 which acts against a ball 241. The upper end of the valve 95 is provided with three notches 242 into any one of which the ball 241 is adapted to seat. The outer or forward end of the spring 239 acts against a screw plug 243 threaded into the outer or forward end of the bore in the casing part 238. Rocking the tubular shaft 217 in one direction or the other from the intermediate position, Figure 5, serves to raise or lower the valve member 95, the ball 241 seating in either the upper or the lower notch 242.

The tubular shaft 217 and the valve operating arm 220 secured thereto are adapted to be rocked in one direction or the other by a hand lever indicated in Figures 9, 10 and 11 in its entirety by the reference numeral 250. The hand lever 250 includes a hub member 251 secured, as by welding 252 (Figure 9) or any other suitable means, to the end of the tubular shaft 217 that extends laterally outwardly of the valve case 57. The member 251 has secured thereto or formed integral therewith a shank section 254 which has a portion slabbed away, as at 255 in Figure 11, and an upwardly and laterally outwardly angled threaded portion 256. A sleeve 257 having internal threads is adjustably mounted on the threaded portion 256 of the shank 252, and a rod or shaft 258 is secured to the upper end of the sleeve 257 and at its upper end carries a knob 259. The shank 254 has an extension 261 of reduced diameter seating in a socket section 262 formed in the upper portion of the sleeve 257. Turning the knob 259 therefore turns the sleeve 257 and screws the same downwardly or upwardly along the shank 254. For the purpose of yieldably holding the sleeve 257 in any position of adjustment, it is provided with a plurality of longitudinal internal grooves 265 and the shank 254 is provided with a detent ball 266 urged outwardly by a spring 267 seating in a cross bore 268 formed in the lower threaded portion 256 of the shank 254. A cam member or stop member, indicated in its entirety by the reference numeral 270 (Figures 9–11) is secured, as by a pin 271, to the end of the shaft 216 (Figure 9) that extends laterally outwardly of the valve case 57. The member 270 includes a cam or stop section 273 to which reference will be made below, the section 273 being disposed in the cut out portion 255 of the shank 254, as best shown in Figures 9 and 11, and in a position in the path of movement of the lower end of the adjustable sleeve 257.

A continuous lowering control linkage, indicated in its entirety by the reference numeral 275 in Figure 8, is adapted to connect the shaft 216 (Figure 9) with the arm 42 that moves with the piston 38 (Figure 1). The continuous control linkage 275 includes an arm 276 (Figures 8 and 9) fixed to the shaft 216 adjacent the laterally inner end of the tubular shaft 217 in any suitable manner, preferably by a set screw 277 (Figure 8) having an inner end 278 that seats in a slot 279 (Figure 9) formed in the shaft 216, whereby the arm 276 is held against movement relative to the shaft 216. The outer end of the arm 276 is connected by a pivot pin 281 to a pair of links 282 which at their lower ends are connected by a pivot pin 283 to one arm 284 of a bell crank 285. The other arm 286 of the bell crank 285 is connected by a link 287 with a lift shaft arm 42, as best shown in Figures 1 and 8. By virtue of the linkage 275 just described, increments of movement of the arm 42 will cause corresponding increments of movement of the shaft 216 and the cam or stop section 273 (Figures 9–11). The bell crank 285 is mounted on a shaft 291 which, as best shown in Figure 3, has one end mounted in the right side wall of the casing 57 and the other end mounted in a lug 292 which is secured to or forms a part of the thickened section 108 (Figure 6) of the valve case 57. As best shown in Figure 3, the portion of the supporting shaft 295 that seats in the lug 292 is of smaller diameter than the other portion, thereby providing a shoulder against which one side of the bell crank 285 abuts.

It may be mentioned at this point, although more detailed reference will be made below when the operation of the mechanism is described, that with the piston 38 in a rear position, in which the tools are lifted, when the handle 250 is moved rearwardly, in a counterclockwise direction as viewed in Figures 5 and 8, the main valve 95 is disposed in a position to cause fluid to be released from the cylinder 35 and will flow through passages 36, 37, 89 and 159 back to the sump. The consequent forward movement of the arm 42 permits the rockshaft 18 to rock in a counterclockwise direction (Figure 1), which movement is normally utilized in farm implements for lowering tools or the like to operating position. As the arm 42 continues to rock in a counterclockwise direction (Figure 1), the link 287 is shifted forwardly and causes the bell crank 285 (Figure 8) to be rocked in a clockwise direction and rocks the arm 276 and shaft 216 in a clockwise direction. This movement of the shaft 216 serves to swing the cam or stop section 273 forwardly, or in a counterclockwise direction as viewed in Figure 10. As the piston 38 continues to move forwardly, the cam or stop section 273 will move into engagement with the lower end of the sleeve 257, a slight additional movement after engagement serving to return the valve control handle 250 to a neutral position, restoring the valve 95 (Figure 5) to its neutral position, as shown. The point at which the valve is returned to neutral position is determined by the position of adjustment of the sleeve 257 on the shank 254, the return of the valve to neutral position taking place after a greater movement of the piston 38 when the sleeve 257 has been unscrewed upwardly than is the case when the sleeve 257 is screwed downwardly toward the stop member 273. Thus, the position of the handle 250 on the arm 254 adjusts the position to which the tools are automatically lowered.

To limit the outward movement of the piston 38 in the tool-raising direction, I provide an end return linkage, indicated in its entirety by the reference numeral 300 in Figure 7, and operative to return the main valve 95 to a neutral position when the piston 38 reaches the end of its outward or rearward movement, entirely irrespective of the position of the lowering control linkage 275 and associated parts. Referring now more particularly to Figures 3 and 7, a bell crank 301 is mounted for rocking movement on the shaft 291 in a position (see Figure 3) between the bell crank 285 and the lug 292. One arm 302 of the bell crank 301 is disposed in a position in the path of movement of the rear end of the link or rod 39 connecting the piston 38 with the lift shaft arm 42. The other arm 303 of the bell crank 301 is apertured at 304 to receive a pin 305, which has a head 306 at the opposite end thereof. The head 306 is pivoted, as at 307, to an arm 308 which is integrally formed with a slotted hub 309, drawn into rigid clamping engagement with the tubular control rockshaft 217 by means of a clamping bolt 311. The pin 305 is freely slidable through the aperture 304 in the arm 303 and a coil spring 313 is coaxially disposed around the pin 305 between the arm 303 and the head 306, against which the opposite ends of the spring 313 bear, respectively. A pin 314 retains the pin 305 within the aperture 304. The spring 313 and pin or rod 305 thus serve as a compressible connection between the piston-actuated bell crank 301 and the member 309 that rocks the valve controlling tubular shaft 217.

Referring to Figures 3 and 5, it will be remembered that the passage 63 opens into communication through the opening 62 with the duct 34 (Figure 1) leading to the high pressure side of the pump 25. A high pressure relief valve is provided for automatically opening communication between the high pressure passage 63 and the sump 33' in the valve box 56 in the event that for any reason the pressure in the pump and high pressure passages rises to an abnormal degree. The relief valve is indicated in Figure 3 by the reference numeral 320 and is normally held in closed position against the seat 321 formed around an opening in one wall of the passage 63 leading directly to the sump 33' by a relatively heavy spring 324. The spring 324 extends transversely across the lower portion of the valve box and at its outer end bears against an adjusting plug 325 screwed into a suitably formed opening in the side wall of the case 57. As best shown in Figure 3, the stem of the valve 320, which is indicated at 326, extends into a blind guide opening 327 formed in the opposite wall of the passage 63, the stem 326 having suitable ducts formed therein to permit the valve 320 to be moved outwardly away from the opening 321 in the event an overload occurs. The relief ducts in the stem 326, permitting the oil to flow into and out of the blind opening 327 are indicated at 328 in Figures 3 and 5. It will be noted that the pressure exerted by the relief spring 324 may be adjusted from outside the valve case 57.

The operation of my new and improved hydraulic control power lift mechanism is substantially as follows.

The pump gears 30 and 31 (Figure 1) rotate at all times that the tractor motor is in operation and the power take-off shaft 22 is rotating. Substantially incompressible fluid, preferably oil, normally fills the entire system, and is continually delivered by the pump 25 upwardly through the passage 34 (Figure 1) through the opening 62 (Figure 5) into the high pressure passage 63. If the pressure does not exceed that for which the relief valve 320 is set, the latter remains closed, and therefore the oil flows upwardly through the passage 63 around the neck 101 of the valve 95 and into the cross bore 104. From there the oil flows from the cross bore 104 into the passage 106 (Figure 6) and around the neck 119 of the valve 115, and thence outwardly through the opening 111 into the sump 33' which, as mentioned above, forms a part of the reservoir or sump indicated in Figure 1 by the reference numeral 33 from which oil is drawn into the pump 25. When the two valves 95 and 115 are in the positions shown in Figures 5 and 6, the pump 25 idles, since the oil flow is not performing any work.

When the piston 38 is disposed at the forward end of the cylinder 35, almost all of the oil has been discharged from the cylinder 35 and disposed in the sump 33, and this is the normal position of the piston when the tools are in a lowered or operating position. In this position, the cam or stop section 273 (Figure 10) is disposed in engagement with the sleeve 257, having previously engaged the latter and returned the hand lever 250 from a rearward position to an upright or neutral position, as shown in Figure 10. Assume now that it is desired to raise the tools. The operator grasps the handle knob 259 and swings the handle 250 forwardly, or in a clockwise direction as viewed in Figures 1 and 5–8. This rocks the tubular control shaft 217 in a corresponding direction, which, acting through the arm 225 and link 226, moves the main valve 95 upwardly out of its neutral position (Figure 5) into an upper position, the detent ball 241 resting in the lower notch 242. In this position of the valve 95, the intermediate cylindrical section 97 closes off the communication between the upper end of the pressure passage 63 and the cross bore 104 but opens communication between the high pressure passage 125 and the upper portion 89a of the branch passage 89 through the opening 125, the oil under pressure flowing through the latter and downwardly about the narrowed neck or shank 102 of the valve and into the upper end of the branch passage. The oil under pressure flows downwardly through the branch passage 89 (Figure 5) and into the lower portion thereof and past the check valve 88 into the chamber 86. A certain amount of oil is by-passed through the leakage opening 158, the amount depending upon the adjustment of the valve 157. From the chamber 86 below the valve 88 the oil flows laterally inwardly and upwardly and into the passageway 85 (Figure 7), and then forwardly through the passage 84 and into the outlet chamber 82 (Figures 7 and 8), from which the oil flows through the opening 66 past the valve 72 and into the passage 37 leading into the passage 36 (Figure 1) that communicates with the closed end of the cylinder 35. It will be noted that in this position of the valve 95 (Figure 5) the cylindrical section 97 closes off communication between the high pressure passage 63 and the cross bore 104, but the lower cross bore 126 is still in communication, through the opening 125, with the high pressure passage 63. However, at its other end the cross bore 126, as best shown in Figure 6, is closed by the cylindrical section 117 of the valve 115, the latter normally being in its neutral or intermediate position, as shown in Figure 6.

Thus, through the path just described, when the operator moves the handle 250 forwardly, oil is directed under pressure into the cylinder 35, forcing the piston 38 therein rearwardly and swinging the rockshaft 18 and arm 42 in a clockwise direction (Figure 1). This movement of the arm 42 acts through the linkage 275 (Figure 8) to rock the shaft 216 in a counterclockwise direction (Figure 8) which swings the cam or stop section 273 rearwardly into its dotted line position, Figure 10, away from the sleeve 257.

As the piston moves outwardly to its terminal position, the rear end of the connecting rod 39 engages the arm 302 (Figures 7 and 8) swinging the same in a clockwise direction as viewed in Figure 7, compressing the spring 313 between the arm 303 and the head 306, the detent ball 241, being seated in the lower notch 242 (Figure 5) serving to hold the control rockshaft 217 against movement until the spring 313 has been compressed by the continued movement of the piston and bell crank 301 until the coils of the spring are in solid contact with each other. Further movement of the piston rod 39 against the bell crank 301 and its arm 302 forces the control rockshaft 217 to move in a counterclockwise direction (Figures 5 and 7) until the ball 241 (Figure 5) is unseated from the lower detent notch 242. The valve 95 is then free to slide within the valve bore 91, and the energy stored in the spring 313 quickly slides the valve element 95 into the neutral or holding position (Figure 5) in which the ball 241 seats in the intermediate notch 242, as shown. The oil under pressure in the cylinder 35, holding the piston 38 in extended position is hydraulically locked against returning to the sump 33 by virtue of the seating of the check valve 88, and as the valve 95 is returned to neutral position, the downward movement of the cylindrical section 97 (Figure 5) of the valve 95 opens communication between the high pressure passage 63 and the upper cross passage 104, the oil then flowing freely through the cross section 104 and outwardly through the passage 106 (Figure 6) and the opening 111 into the sump 33'.

Assume, next, that with the tools in raised position and, as described, with the piston 38 hydraulically locked in its extended or rearward position, the operator now desires to return the tools to their lowered position. This is done by moving the hand lever 250 rearwardly from its upright or neutral position in a counter-clockwise direction (Figure 5) which moves the valve 95 downwardly into a position with the detent 241 engaging the upper notch 242 and with the lower end of the valve 95 engaging the upper end of the stem of the check valve 88, opening the latter and permitting the oil in the cylinder 35 to flow rearwardly through the passages 36 and 37 past the partially open valve 72 and into the passage 81 which, as described above, leads into the chamber 86. Oil from the latter zone passes through the open valve 88 and through the branch passage 89 and through the lower end of the valve bore 91 around the neck or shank 102 of the valve and into the opening 159 leading directly into the sump 33'. The rate of lowering of the tools depends upon the adjustment of the valve 72 (Figure 8). As the tools lower, usually under the action of gravity, the rockshaft 18 (Figure 1) rocks in a counterclockwise direction, causing the piston 38 to be moved forwardly. As the arm 42 on the rockshaft 18 swings in a counterclockwise direction, a pull is exerted through the link 287, rocking the bell crank 285 in a clockwise direction (Figure 8) and swinging the arm 276 and the shaft 216 in a clockwise direction, counterclockwise as viewed in Figure 10. Thus, as the tools move downwardly to their lowered position the corresponding movement of the shaft 216 swings the cam or stop section 273 (Figure 10) forwardly, ultimately engaging the lower end of the sleeve 257 and moving the hand lever 250 forwardly, restoring it to its neutral position, which movement acts through the tubular rockshaft 217 (Figures 5 and 9) to lift the valve 95 into its neutral position, which permits the valve 88 to close, thus preventing further flow of fluid from the cylinder 35. It will thus be seen that the position of adjustment of the sleeve 257 on the threaded shank 254 determines the point at which the tools will automatically be locked in a lowered position. To have the tools move to a relatively shallow operating position, the sleeve 257 should be screwed downwardly on the shank 254 so that the cam section 273 will engage the edge of the sleeve 257 earlier in the cycle than would be the case if the sleeve 257 were adjusted outwardly, which corresponds to a position of deeper operation.

The auxiliary cylinder 50 is under the control of the valve handle 177. The latter is mounted at the right side of the valve box 56 and, as best shown in Figure 9, is directly connected to the shaft 175 on which the arm 181 (Figure 4) is mounted, the arm 181 being connected through the link 203 with the valve 115. Swinging the handle 177 forwardly (counterclockwise as viewed in Figure 4) acts through the links 203 to raise the valve 115. The action of the valve, so far as the control of the fluid is concerned, is substantially like the valve 95. The upward movement of the valve 115 (Figure 6) closes the opening 111 through which the oil from the high pressure passages normally flows into the sump 33'. When the opening 111 is closed, the oil is forced to flow from the high pressure passage 63 through the opening 125 and around the annular groove 125a (Figure 5) into the cross passage 126. Since the valve 115 (Figure 6) is in an upper position, the lower edge of the intermediate cylindrical section 117 lies adjacent the upper edge of the opening 127. Hence, oil under pressure flows downwardly around the neck 121 of the valve 115 and through the passage extension 132 into the branch passage 131. From thence the oil flows downwardly through the opening 135, past the valve 136, and into the outlet chamber 134. As best shown in Figure 3, from this point the oil under pressure flows outwardly through the opening 143 and the connection 146 into the hose 147 that leads to the ram unit 50. As shown in Figure 6, a certain amount of oil passes through the leak opening 152 into the sump 33', the action being the same as for the leak opening 158 (Figure 5). The pump 25 (Figure 1) being of the positive displacement type, and the shaft 22 normally being driven at a substantially constant rate, it will be seen that the time of operation of the ram units 50 and 51 will depend only upon their respective effective volumes. To secure the maximum in speed of operation, the leak passages 152 and 158 will be entirely closed, but if somewhat slower action is desired, the valves 157 and 154 will be opened, the greater the amount of opening the slower the operation of the associated ram unit.

It is to be understood that the ram unit 50, being connected by a flexible hose 147 with the valve box 56, may be disposed in any suitable location on the implement, depending upon the function it is to serve. Usually, it is so connected with tools or other parts as to shift them against a force, such as their own weight, in which case when the handle 177 is moved in the other direction to permit the oil from the ram unit 50 to flow back into the sump, the weight of the tools and associated parts is sufficient to force the oil at an acceptably rapid rate back into the reservoir. If the weight of the tools is not available or is not adequate, springs 330 may be utilized, being diagrammatically shown in Figure 3, for retracting the piston member 331 of the ram unit 50.

When it is desired to permit the ram unit 50 to retract, as for lowering the tools, the handle 177 is swung rearwardly, clockwise as viewed in Figure 4. This moves the valve 115 (Figure 6) downwardly, forcing the check valve 136 to open so that oil from the ram unit 50 may flow back through the hose 147 into the outlet chamber 134, and then past the valve 136, up the branch passage 131, 132 and then downwardly around the stem 121 of the valve 115 and out into the reservoir through the opening or space 151. The action of the yoke 189 and associated spring mechanism tending to hold the valve 115 and handle 177 in neutral position, has been described above. Oil may be added to the system from time to time as desired by removing one or both of the filter plugs F in the upper wall of the valve box.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A power lift mechanism for tractors and the like having a source of fluid pressure, comprising a cylinder closed at one end and open at the other, a piston and piston rod movable therein, fluid connections leading from said source to the closed end of said cylinder and including a control box mounted adjacent the open end of said cylinder and movable valve means in said box, a rockshaft journaled in said control box and operatively connected with said valve means for shifting the latter, releasable detent means retaining said valve means in a position in which fluid is directed to the closed end of said cylinder, control means outside said box and operatively connected with said rockshaft, a bell crank rockably mounted in said control box adjacent said rockshaft and having one arm disposed in the path of movement of the outer end of said piston rod, and resiliently yieldable means connecting the other arm of said bell crank with said rockshaft, whereby movement of said piston to a given position acts through said bell crank, said yieldable means, and said rockshaft to overcome said detent means and to shift said valve means into a position cutting off flow of fluid to the closed end of said cylinder.

2. Control mechanism for a hydraulic actuated device including a cylinder and a movable piston member therein, comprising a valve box said cylinder and valve box each having an open end and the open end of the valve box facing the open end of said cylinder, said piston member including a part adapted in one position to extend out of the open end of the cylinder and into a position adjacent the open end of said valve box, a valve element in said valve box and shiftable between open and closed positions, means in said valve box for yieldably retaining said element in one of said positions, means in said valve box including a bell crank rockably mounted in said valve box adjacent said valve element and having one arm disposed adjacent said opening in the path of movement of said piston member in a position to be engaged by said piston member when the latter reaches a predetermined position for moving said valve element to the other of said positions, the other arm of said bell crank being connected with said valve member by means including a spring for transmitting force therebetween to insure a complete movement of said element from one position to the other.

3. Control mechanism for a hydraulic actuated device including a cylinder and a movable piston member therein, comprising a valve box disposed adjacent one end of said cylinder, a duct in said valve box for supplying hydraulic fluid to said device, a valve element movable across said duct for controlling said fluid supply, said element being shiftable between open and closed positions relative to said supply duct, detent means carried by said valve box, for yieldably retaining said element in said open position in which fluid is supplied to said device to move said piston member, a shaft journaled in said valve box, linkage means connecting said piston and said shaft whereby the latter moves concomitantly with the piston, a tubular shaft supported at least in part on said first shaft and operatively connected with said valve element, a manually actuated lever mounted on said tubular shaft, the end of the latter and the adjacent end of said first shaft extending outside said valve box and said manually actuated lever being also outside said valve box, means for automatically shifting said element from open to closed position to stop said piston member when it reaches a predetermined terminal position, comprising a part engageable by said piston member, an arm fixed to said tubular shaft, and a spring interconnecting said part and said arm and adapted to be stressed by movement of said part caused by motion of said member in one direction, to insure completion of said movement of said valve element into full closed position after the latter has been disengaged from said detent, a second part adjustably mounted on said manually actuated lever, and means on the outer end of said first shaft engageable with said adjustable part and acting through the lever and tubular shaft for also shifting said element from open to closed position to stop said piston member when the latter moves in the opposite direction and reaches a position determined by the position of said adjustable part on said lever.

4. Hydraulic mechanism comprising a single source of fluid pressure, a pair of separately movable cylinder and piston units, a valve box having two sets of valve-controlled passages, each having a movable valve therein, and a high pressure passage connected with said source of fluid pressure and leading to said valve controlled passages, separate passages leading respectively, from said valve controlled passages to said cylinder and piston units, a shaft journaled in said valve box at one side thereof and operatively connected with one of said movable valves, a tubular shaft journaled in said valve box at the other side thereof and operatively connected with the other of said movable valves, a control shaft supported at one end on said first shaft and at the other end in said tubular shaft, means connecting said control shaft with the piston of the associated cylinder and piston unit so as to move said control shaft concomitantly with said piston, and an adjustable connection between said control shaft and said tubular shaft whereby to terminate the flow of fluid from said source to said cylinder and piston unit when the piston in the latter unit has moved an amount, depending on the adjustment of said adjustable connection.

5. Control mechanism for a hydraulically operated device that includes two piston and cylinder units respectively connected with parts to be actuated, said mechanism including a valve box, a tubular shaft journaled in one wall of said valve box, a second shaft journaled in the opposite wall of said valve box, said shafts being in alignment, a third shaft extending through said tubular shaft and socketed in said second shaft, means connecting the latter with control valve means for one of said units for controlling the same independently of the other unit, means connecting said tubular shaft with control valve means for said other unit for controlling the latter, two means for operating said control valve means for said other unit, one connected to the outer end of said tubular shaft and the other connected to the inner end of said third shaft, and means at the outer end of said third shaft for operating said tubular shaft.

6. Control mechanism for a hydraulically operated device that includes two piston and cylinder units respectively connected with parts to be actuated, said mechanism including a valve box, a tubular shaft journaled in one wall of said valve box, a second shaft journaled in the opposite wall of said valve box, said shafts being in alignment, a third shaft extending through said tubular shaft and socketed in said second shaft, means connecting the latter with control valve means for one of said units for controlling the same independently of the other unit, means connecting said tubular shaft with control valve means for said other unit for controlling the latter, an operating part including a threaded member secured to the outer end of said tubular shaft, a handle comprising a part adjustable on said threaded member, a cam member on the outer end of said third shaft disposed in a position to engage and move said adjustable part for actuating said tubular shaft and said control valve means for the associated piston and cylinder unit, and means movable with the part actuated by said last mentioned unit for rocking said third shaft and acting through said cam member and tubular shaft for controlling said last mentioned unit.

7. Hydraulic mechanism comprising a casing having a valve passage, a valve member slidable therein and comprising a pair of spaced closure sections connected by a neck of reduced diameter, said valve passage having a high pressure inlet intersecting said passage adjacent one end of the latter, the opposite end of said passage serving as an exhaust opening, said valve member being normally so positioned that one of said closure sections blocks said inlet and the other section is positioned adjacent said opposite end of the passage, said casing having an outlet duct intersecting the intermediate portion of said valve passage and extending to a check valve seat disposed substantially coaxially of said valve passage in said casing beyond said exhaust opening, a spring biased check valve covering said seat, said check valve having a stem extending through the casing wall forming said outlet duct and terminating adjacent the end of said valve member, and means for shifting said valve member in one direction from said normal position to keep said inlet closed, open said exhaust opening and engage said check valve stem to open said check valve, and in the other direction to close said exhaust opening and connect said inlet to said outlet duct.

8. The combination set forth in claim 7 including the further provision that said outlet duct is provided with an exhaust port, and an adjustable valve in said port for adjusting the amount of opening to provide for bleeding a portion of the fluid supplied to said outlet port.

9. Hydraulic mechanism comprising a casing having a reservoir and a pair of valve passages, a valve member slidable in each of said passages, each of said members comprising a pair of spaced closure sections connected by a neck of reduced diameter, each of said valve passages having a high pressure inlet intersecting it adjacent one end thereof and a common by-pass intersecting said passages and connected with said reservoir, the other end of each valve passage serving as an exhaust opening and connected with the reservoir, each of said valve members being normally so positioned that one of said closure sections blocks said inlet and the other section is positioned adjacent said opposite end of the passage, said casing having a pair of outlet ducts intersecting the intermediate portions of said valve passages, respectively, each duct having a check valve seat disposed substantially coaxial of the associated valve passage in said casing beyond said exhaust opening, spring biased check valves covering said seats, respectively, and having stems extending through the casing wall forming said outlet ducts and terminating adjacent the ends of the associated valve members, and means for independently shifting each of said valve members in one direction from said normal position to keep said inlet closed, open said exhaust openings and said by-pass and engage said check valve stems to open said check valves, and in the other direction to close said exhaust openings and said by-pass and to connect said inlet to said outlet ducts.

10. Hydraulic mechanism comprising a cylinder, a piston movable therein, a part connected to said piston for transmitting force therefrom, a source of fluid pressure, fluid connections leading from said source to said cylinder and including a control valve for controlling movements of said piston therein, and control mechanism for said valve comprising a tubular shaft and an inner shaft journaled coaxially therein, means connecting one of said coaxial shafts to said valve for actuating the latter by rocking the shaft, said valve being adapted to cause said piston to move in relatively opposite directions responsive to rocking said valve connected shaft in opposite directions, respectively, from a neutral position, manually operated means mounted on said one shaft for rocking the latter in either direction, selectively, an arm connected with said one shaft and engageable by said piston connected part for returning said shaft to said neutral position to interrupt the flow of fluid to said cylinder when the piston moves to a predetermined point in one direction, an arm connected with the other of said shafts, means connecting said last mentioned arm with said piston connected part for rocking said other shaft by movement of said piston, and an adjustable device connecting said coaxial shafts for returning said valve-connected shaft to said neutral position when the piston moves to a predetermined point in the other direction to stop the piston.

11. Hydraulic mechanism comprising a casing, a cylinder associated therewith, a piston movable in said cylinder and having a force transmitting part connected thereto and extending into said casing, a power transmitting rockshaft mounted in said casing and connected to said part, a source of fluid pressure, fluid connections in said casing leading from said source to said cylinder and including a valve passage and a control valve slidable therein in relatively opposite directions from a neutral position to cause said piston to move toward either end of said cylinder, respectively, spring biased detent means engaging said valve for yieldably holding the latter in adjusted position, and control mechanism for said valve comprising a tubular shaft journaled in said casing, an inner shaft journaled coaxially within said tubular shaft, an arm on one of said shafts swingably connected to said valve for shifting the latter responsive to rocking movement of said shaft, a crank arm disposed in the casing in the path of movement of said piston connected part, a spring connecting said crank arm to said one shaft and adapted to be stressed when the piston connected part engages said crank arm at a predetermined point in its movement in one direction, said spring thereby overcoming said detent and shifting said valve to said neutral position, an arm fixed to the other of said shafts within said casing and connected with said piston to rock said shaft by movement of the piston, said coaxial shafts extending out of said casing through a suitable opening, said one shaft having a hand lever mounted thereon outside said casing for rocking the shaft to control said piston, and an adjustable device comprising a one-way connection between said coaxial shafts, engageable responsive to movement of the piston to a predetermined point in its movement in the opposite direction for returning said valve to neutral position to stop said piston.

12. Hydraulic mechanism comprising a casing, a cylinder associated therewith, a piston movable in said cylinder and having a force transmitting part connected thereto and extending into said casing, a power transmitting rockshaft mounted in said casing and connected to said part, a source of fluid pressure, fluid connections in said casing leading from said source to said cylinder and including a valve passage and a control valve slidable therein in relatively opposite directions from a neutral position to cause said piston to move toward either end of said cylinder, respectively, spring biased detent means engaging said valve for yieldably holding the latter in adjusted position, a second valve passage in said casing and a valve slidably disposed therein, said valves being disposed vertically at opposite sides of said casing, fluid connections between said second valve passage and said source and to a second cylinder, and control mechanism for said valves comprising a pair of coaxially disposed tubular shafts spaced laterally and journaled in opposite side walls of said casing and extending outwardly thereof and having arms fixed thereto swingably connected with said valves, respectively, a hand lever mounted on each of said shafts outside said casing walls for rocking said shafts independently to shift said valves from said neutral position in either direction, selectively, a crank arm mounted within said casing between said valves and engageable by said piston connected part when the piston reaches a predetermined point in its movement in one direction, a spring connecting said crank arm to the tubular control shaft associated with the first mentioned cylinder and adapted to be stressed when said piston connected part engages said crank arm thereby overcoming said detent and shifting said valve to said neutral position, an inner shaft journaled at opposite ends, respectively, in said laterally spaced tubular shafts and extending laterally outwardly through one of said tubular shafts, an arm fixed to said inner shaft between the spaced inner ends of said tubular shafts and connected with said piston connected part to be rocked thereby, and an adjustable one-way connection between the outer ends of said tubular and inner shafts engageable responsive to movement of the piston to a predetermined point in its movement in the opposite direction for returning the valve to neutral position to stop said piston.

13. Hydraulic mechanism comprising a casing, a cylinder associated therewith, a piston movable in said cylinder and having a force transmitting part connected thereto and extending into said casing, a power transmitting rockshaft mounted in said casing and connected to said part, a source of fluid pressure, fluid connections in said casing leading from said source to said cylinder and including a valve passage and a control valve slidable therein in relatively opposite directions from a neutral position to cause said piston to move toward either end of said cylinder, respectively, a second valve passage in said casing and a valve slidably disposed therein, said valves being disposed vertically at opposite sides of said casing, fluid connections between said second valve passage and said source and to a second cylinder, and control mechanism for said valves comprising a pair of coaxially disposed tubular shafts spaced laterally and journaled in opposite side walls of said casing and extending outwardly thereof and having arms fixed thereto swingably connected with said valves, respectively, a hand lever mounted on each of said shafts outside said casing walls for rocking said shafts independently to shift said valves from said neutral position in either direction, selectively, a supporting shaft mounted in said casing below said tubular shafts and between said valves, a crank arm journaled on said supporting shaft and engageable by said piston connected part when the piston reaches a predetermined point in its movement in one direction, means connecting said crank arm to the tubular control shaft associated with the first mentioned cylinder for rocking said shaft when said piston connected part engages said crank arm, thereby shifting the valve to said neutral position, an inner shaft journaled at opposite ends, respectively, in said laterally spaced tubular shafts and extending laterally outwardly through one of said tubular shafts, an arm fixed to said inner shaft between the spaced inner ends of said tubular shafts, a bell crank journaled on said supporting shaft adjacent said crank arm, link means connecting said bell crank with said inner shaft and with said piston connected part to transmit movement from the latter to rock said inner shaft, and an adjustable one-way connection between the outer ends of said tubular and inner shafts engageable responsive to movement of the piston to a predetermined point in its movement in the opposite direction for returning the valve to neutral position to stop said piston.

14. A power lift mechanism for tractors and the like having a source of fluid pressure, comprising a cylinder closed at one end and open at the other, a piston and piston rod movable therein, fluid connections leading from said source to the closed end of said cylinder and including a control box mounted adjacent the open end of said cylinder and movable valve means in said box, a rockshaft journaled in said control box and operatively connected with said valve means for shifting the latter, releasable detent means retaining said valve means in a position in which fluid is directed to the closed end of said cylinder, control means outside said box and operatively connected with said rockshaft, a bell crank rockably mounted in said control box adjacent said rockshaft and having one arm disposed in the path of movement of the outer end of said piston rod, an arm fixed to said rockshaft and resiliently yieldable means connecting said rockshaft arm with the other arm of said bell crank, comprising a rod pivotally connected to one of said last mentioned arms and extending through an aperture in the other and a helical compression spring encircling said rod and bearing at opposite ends on said arms, whereby movement of said piston to a given position acts through said bell crank, said compression spring, and said rockshaft to overcome said detent means and to shift said valve means into a position cutting off flow of fluid to the closed end of said cylinder.

WAYNE H. WORTHINGTON.